（12）United States Patent
Lee

(10) Patent No.: US 10,351,163 B2
(45) Date of Patent: Jul. 16, 2019

(54) REDUCER OF ELECTRIC POWER STEERING APPARATUS

(71) Applicant: MANDO CORPORATION, Pyeongtaek-si, Gyeonggi-do (KR)

(72) Inventor: Kwon Ho Lee, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 381 days.

(21) Appl. No.: 15/365,573

(22) Filed: Nov. 30, 2016

(65) Prior Publication Data

US 2017/0183026 A1 Jun. 29, 2017

(30) Foreign Application Priority Data

Dec. 24, 2015 (KR) .................. 10-2015-0186300

(51) Int. Cl.

| | |
|---|---|
| *B62D 5/00* | (2006.01) |
| *B62D 3/10* | (2006.01) |
| *B62D 5/04* | (2006.01) |
| *F16H 55/24* | (2006.01) |
| *F16H 57/039* | (2012.01) |
| *F16C 25/08* | (2006.01) |
| *F16H 1/16* | (2006.01) |

(52) U.S. Cl.
CPC .............. *B62D 5/008* (2013.01); *B62D 3/10* (2013.01); *B62D 5/0409* (2013.01); *F16C 25/083* (2013.01); *F16H 55/24* (2013.01); *F16H 57/039* (2013.01); *F16C 2326/24* (2013.01); *F16H 1/16* (2013.01)

(58) Field of Classification Search
CPC ................................ F16H 55/24; B62D 5/008
See application file for complete search history.

(56) References Cited

U.S. PATENT DOCUMENTS

| 2004/0163879 A1* | 8/2004 | Segawa ............... B62D 5/0409 180/444 |
| 2014/0352467 A1* | 12/2014 | Kwon ....................... F16H 1/26 74/400 |
| 2016/0201760 A1* | 7/2016 | Kwon ....................... F16H 1/16 74/409 |

FOREIGN PATENT DOCUMENTS

| CN | 202863531 U | 4/2013 | |
| CN | 104417602 A | 3/2015 | |
| CN | 104948667 A | 9/2015 | |
| CN | 204775441 U | 11/2015 | |
| JP | 2016211615 A * | 12/2016 | ............. F16H 57/12 |
| WO | WO-03047948 A1 * | 6/2003 | ........... B62D 5/0409 |

OTHER PUBLICATIONS

Chinese Office Action dated Jul. 24, 2018 issued in Chinese Patent Application No. 201611204968.1.

* cited by examiner

*Primary Examiner* — Terence Boes
(74) *Attorney, Agent, or Firm* — Morgan, Lewis & Bockius, LLP

(57) ABSTRACT

The present invention is related to a reducer of an electric power steering apparatus. An embodiment of the present invention provides a reducer of an electric power steering device. The reducer includes: a worm shaft having a worm formed thereon; a worm wheel having a worm gear formed thereon to be engaged with the worm; and a clearance compensation device coupled to a worm shaft bearing provided on an end of the worm shaft and configured to elastically support the end of the worm shaft within a reducer housing.

12 Claims, 8 Drawing Sheets

REDUCER OF ELECTRIC POWER STEERING APPARATUS

CROSS REFERENCE TO RELATED APPLICATION

This application claims priority from Korean Patent Application No. 10-2015-0186300, filed on Dec. 24, 2015, which is hereby incorporated by reference for all purposes as if fully set forth herein.

BACKGROUND OF THE INVENTION

1. Field of the Invention

The present invention relates to a reducer of an electric power steering apparatus. More particularly, the present invention relates to a reducer of an electric power steering apparatus that is capable of: correctly assisting a driver's steering wheel operating force by preventing a clearance from occurring by the wear and tear of a worm and a worm wheel; reducing impact transferred from a road surface and rattle noise generated by a backlash; and minimizing a variation of the clearance according to the change of a rotational torque.

2. Description of the Prior Art

FIG. 1 is a view illustrating a configuration of a conventional electric power steering apparatus. As illustrated in FIG. 1, a conventional electric power steering apparatus 100 includes: a steering system 130 continued from a steering wheel 102 to opposite vehicle wheels 126; and an assist power mechanism 140 configured to provide a steering assist power to the steering system 130.

The steering system 130 includes a steering shaft 106 that is connected, at one side, to the steering wheel 102 to be rotated with the steering wheel 102, and connected, at the other side, to a pinion shaft 108 via a pair of universal joints 104. In addition, the pinion shaft 108 is connected to a rack bar 112 through a rack and pinion mechanism 110, and the opposite ends of the rack bar 112 are connected to the vehicle wheels 126 through tie rods 122 and knuckle arms 124, respectively.

The assist power mechanism 140 includes: a torque sensor 142 configured to sense a torque that is applied to the steering wheel 102 by the driver and to output an electric signal that is proportional to the sensed torque; an electronic control unit 144 configured to generate a control signal based on the electric signal transferred from the torque sensor 142; a motor 146 configured to generate an assist power based on the control signal transferred from the electronic control unit 144; and a reducer 150 including a worm 152 and a worm wheel 156 in order to transmit the assist power generated by the motor 146 to the steering shaft 106.

Accordingly, the electric power steering apparatus is configured such that a torque generated by the rotation of the steering wheel 102 is transmitted to the rack bar 112 via the rack and pinion mechanism 110, and the assist power generated by the motor 146 according to the generated torque is transmitted to the rack bar 112.

That is, the torque generated by the rotation of the steering wheel 102 and the assist power generated by the motor 146 are combined with each other so as to cause the rack bar 112 to move in an axial direction.

FIG. 2 is a cross-sectional view illustrating a reducer of a conventional electric power steering apparatus. As illustrated in FIG. 2, the reducer 150 is provided with a worm shaft 254 on which the worm 152 is formed, and worm shaft bearings 257 are respectively installed at the opposite ends of the worm shaft 254 to support the worm shaft 254. In order to prevent the worm shaft bearings 257 from being loosened in the axial direction of the worm shaft 254, a plug bolt 210 is fastened between a damping coupler 240 and the worm shaft bearings 257, and the plug bolt 210 is fixed by a plug nut 220.

The worm shaft 254 has a structure in which the worm shaft 254 is connected with the motor 146 via the damping coupler 240 such that the worm shaft 254 is rotated by the driving of the motor 146.

In addition, a worm wheel 156 is provided at one side of the outer diameter of the worm to be engaged with the worm 152 formed on the worm shaft 254. The worm wheel 156 is configured to transmit the torque of the worm shaft 254 applied by the driving of the motor to the steering shaft 106 by being mounted on the steering shaft 106 configured to transmit the torque of the steering wheel 102 operated by the driver.

The worm 152, the worm wheel 156, and so on are provided within a reducer housing 260, and the motor 146 is provided at one side of the reducer housing 260 to provide a driving force to the worm shaft 254. The reducer housing 260 and the motor 146 are coupled to each other by a motor cover 230 with a bolt 250.

Each of the worm shaft bearings 257 includes balls 258 interposed between an inner race 280 and an outer race 270 so as to support the rotation of the worm shaft 254 connected to the motor 150 at the end of the reducer housing 260.

The reducer of the electric power steering apparatus configured as described above is configured to control the driving of the motor by an electronic control unit provided in a vehicle depending on a running condition of the vehicle, and to cause the torque of the worm shaft applied by the driving of the motor to be transmitted to the steering shaft in addition to the torque of the steering wheel operated by the driver such that the driver's steering and driving conditions can be maintained smoothly and stably.

However, the conventional reducer of the electric power steering apparatus has a problem in that when the worm and the worm wheel, which are rotated by the driving of the motor, are aged, noise is generated due to the clearance occurring by the wear and tear of the worm and the worm wheel.

In addition, there is a problem in that noise is generated due to impact transferred from a road surface through the vehicle wheels and the steering shaft and a backlash between the worm and the worm wheel.

Accordingly, there is also a problem in that the steering assist power, which assists the driver's steering wheel operating force, cannot be correctly transmitted due to the problems described above.

SUMMARY OF THE INVENTION

The present invention has been made in order to solve the above-mentioned problems, and an object of the present invention is to provide a reducer of an electric power steering apparatus that is capable of: correctly assisting a driver's steering wheel operating force by preventing a clearance from occurring by the wear and tear of a worm and a worm wheel; reducing impact transferred from a road surface and rattle noise generated by a backlash; and minimizing a variation of the clearance according to the change of a rotational torque.

The object of the present invention is not limited to those described above, and other objects, which are not described above, may be clearly understood by a person ordinarily skilled in the art from the following description.

In order to achieve such an object, according to an embodiment of the present invention, there may be provided a reducer of an electric power steering apparatus. The reducer includes: a worm shaft having a worm formed thereon; a worm wheel having a worm gear formed thereon to be engaged with the worm; and a clearance compensation device coupled to a worm shaft bearing provided on an end of the worm shaft and, in order to elastically support the end of the worm shaft within a reducer housing, including a ring-shaped support member coupled to inside the reducer housing and a damping member coupled to an outer peripheral side of the support member to be elastically supported by the reducer housing, the support member having a seating recess formed on an outer peripheral surface in a circumferential direction such that an inner peripheral surface of the damping member is seated in the seating recess to be supported.

According to the present invention, a reducer of an electric power steering apparatus is capable of correctly assisting a driver's steering wheel operating force by preventing a clearance from occurring by the wear and tear of a worm and a worm wheel, reducing impact transferred from a road surface and rattle noise generated by a backlash, and minimizing a variation of the clearance according to the change of a rotational torque.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
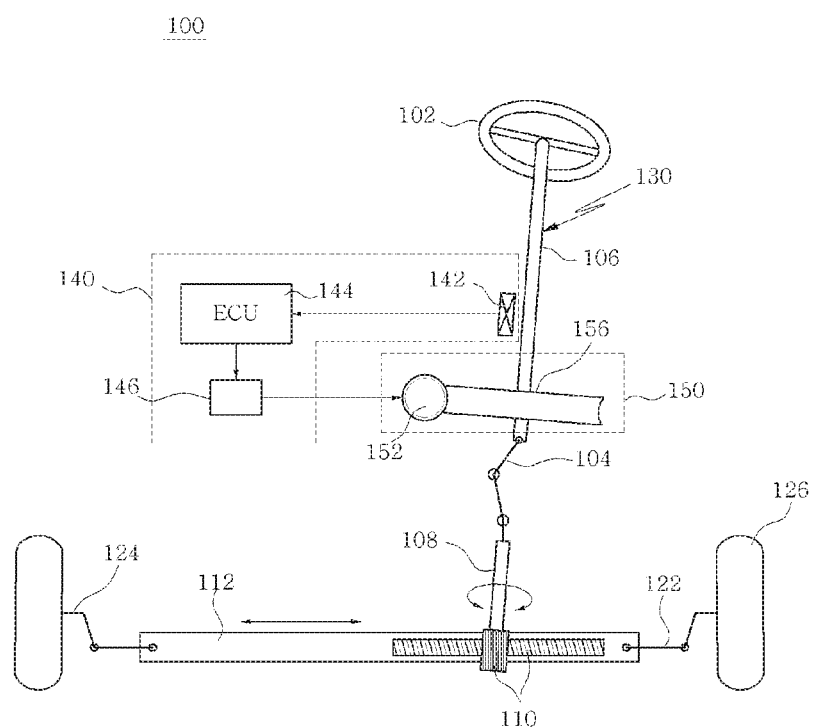
FIG. 1 is a view illustrating a configuration of a conventional electric power steering apparatus.
Figure 2:
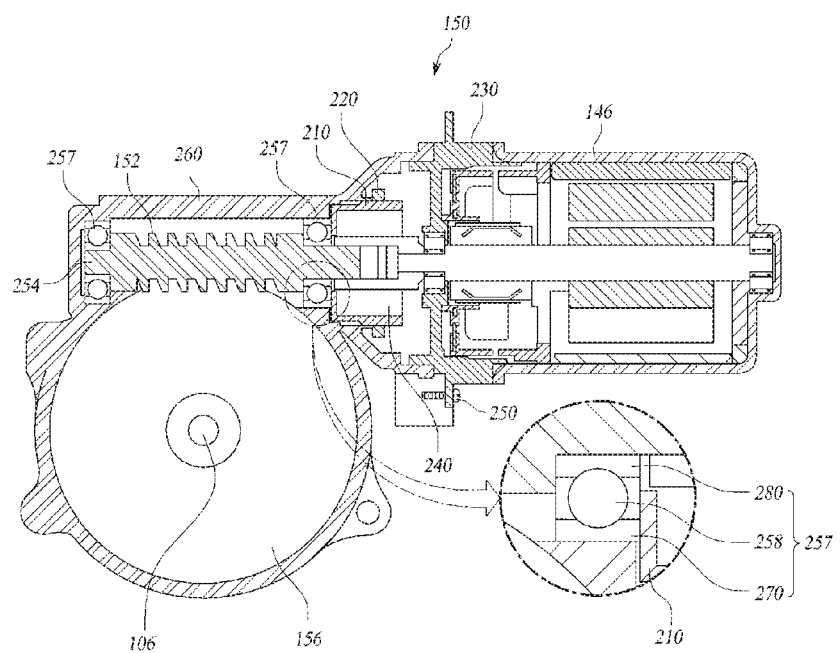
FIG. 2 is a cross-sectional view illustrating a reducer of the conventional electric power steering apparatus.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
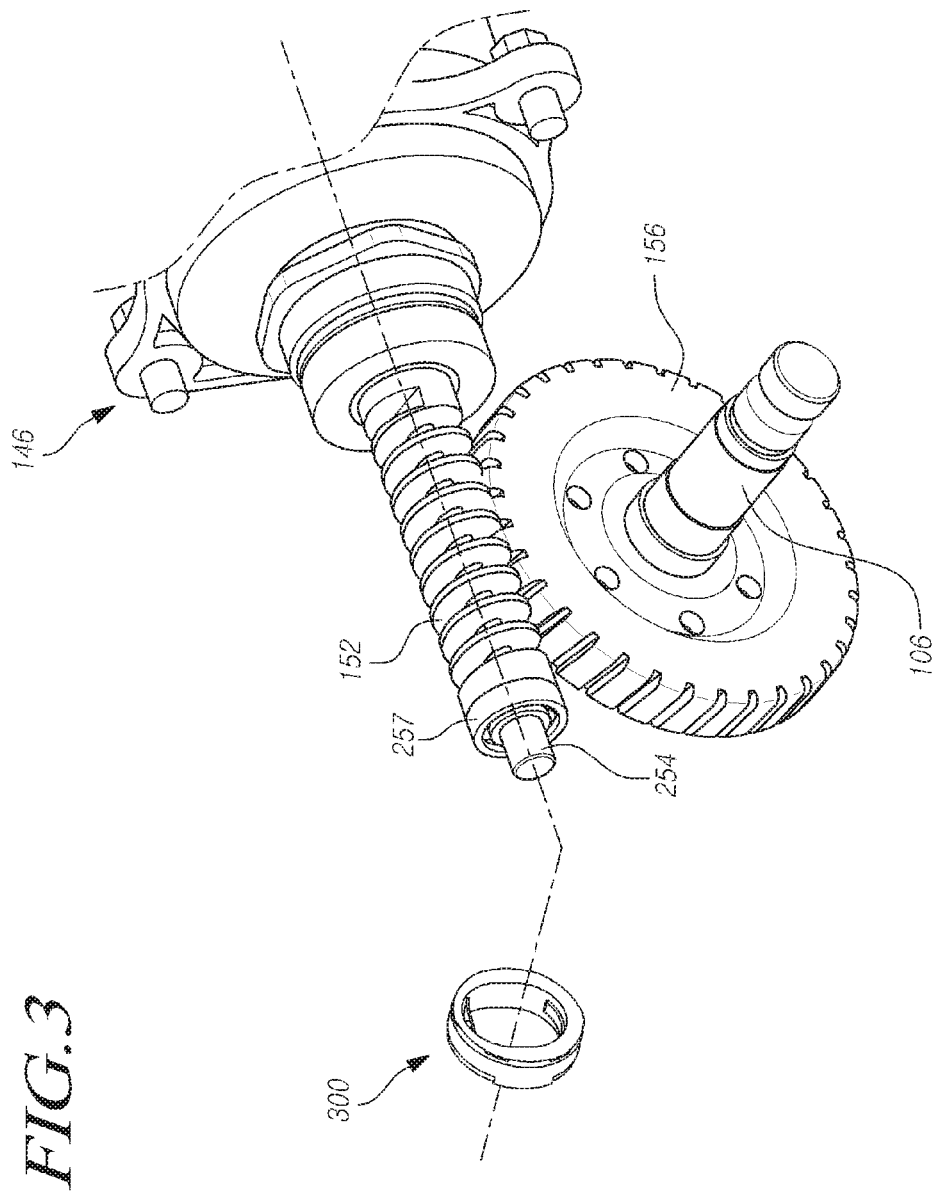
FIG. 3 is an exploded perspective view illustrating a reducer of an electric power steering apparatus according to an embodiment of the present invention.
Figure 4:
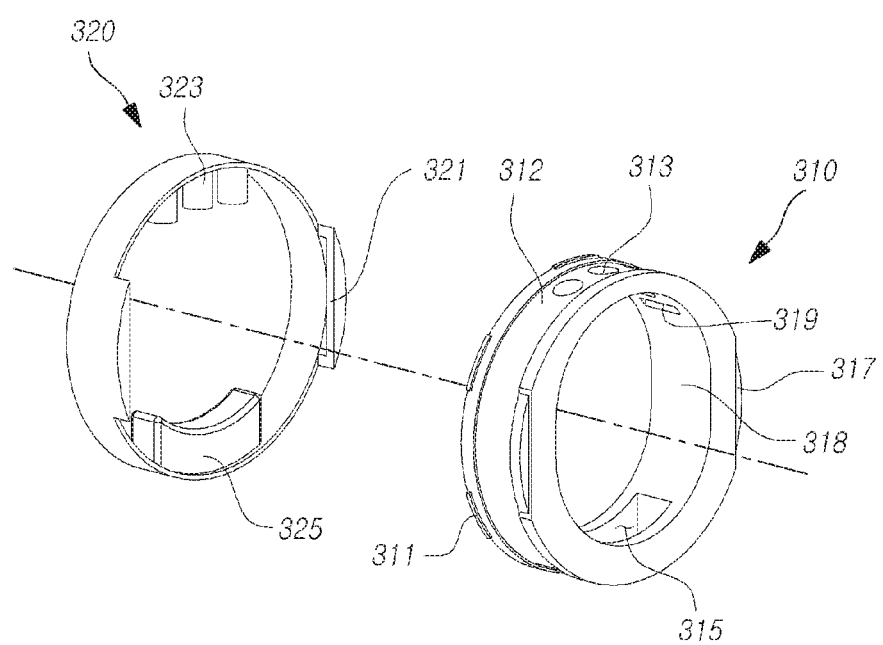
FIG. 4 is an exploded perspective view illustrating a portion of the reducer of the electric power steering apparatus according to the embodiment of the present invention.

FIG. 3 is an exploded perspective view illustrating a reducer of an electric power steering apparatus according to an embodiment of the present invention, FIG. 4 is an exploded perspective view illustrating a portion of the reducer of the electric power steering apparatus according to the embodiment of the present invention, and FIGS. 5 to 8 are cross-sectional views each illustrating a reducer of an electric power steering apparatus according to an embodiment of the present invention.

As illustrated in the drawings, a reducer of an electric power steering apparatus according to an embodiment of the present invention includes: a worm shaft 254 including a worm 152 formed thereon; a worm wheel 156 including a worm gear formed thereon to be engaged with the worm 152; and a clearance compensation device 300 coupled to a worm shaft bearing 257 and configured to elastically support an end of the worm shaft 254 within a reducer housing 260.

The reducer rotates a steering shaft 106 as the worm shaft 254 and the worm wheel 156 are cooperatively operated by the driving force of the motor 146 to assist the driver's steering force. During the driving of the motor 146, the worm shaft bearing 257, which is fastened to each end of the worm shaft 254 cooperatively operated with the shaft of the motor 146, rotatably supports the worm shaft 254, and the worm wheel 156 and the worm shaft 254, which are cooperatively operated with the steering shaft 106, are provided within the reducer housing 260.

Meanwhile, at the opposite side to the motor 146, the worm shaft bearing 257, which includes balls 257b interposed between the inner race 257a and the outer race 257c thereof, rotatably supports the worm shaft 254, and the clearance compensation device 300 is coupled to the end of the worm shaft 254 to elastically support the end of the worm shaft 254 within the reducer housing 260.

That is, a clearance is changed by the forward and reverse rotation of the worm shaft 254, which generates backlash and noise. Further, when the worm shaft 254 and the worm wheel 156, which are rotated by the driving of the motor, are aged, a clearance is produced due to the wear and tear of the worm shaft 254, which also generates backlash and noise. In particular, during the traveling of the vehicle, impact is transferred from a road surface via the steering shaft. In order to reduce the noise, backlash, and impact, at the opposite side of the coupling part between the shaft of the motor 146 and the worm shaft 254, the clearance compensation device 300 is mounted to apply a compensation force to the worm shaft 254 in a direction where the worm shaft 254 meshes with the worm wheel 156, and to support the worm wheel 156 in a direction opposite to the direction where the worm shaft 254 meshes with the worm wheel 156 when excessive meshing is caused between the worm shaft 254 and the worm wheel 156.

The clearance compensation device 300 is configured with a support member 310 coupled to the inside of the reducer housing 260, a damping member 320 coupled to the outer periphery side of the support member 310, and so on.

The support member 310 is formed in a ring shape, and is coupled to the reducer housing 260 in a state where the damping member 320 is coupled to the outer periphery side, thereby supporting the worm shaft bearing 257.

Here, the support member 310 may be made of an engineering plastic series material, such as polyoxymethylene (POM), polyamide (PA), polycarbonate (PC), polyimide (PI), or polybutylene terephthalate (PBT), or a metallic material.

In addition, a seating recess 312 is formed in the circumferential direction on the outer peripheral surface of the support member 310 such that the inner peripheral surface of the damping member 320 is seated in the seating recess 312 and the outer peripheral surface of the damping member 320 is elastically supported by the reducer housing 260.

In addition, on an outer edge of one side end of the support member 310, radially protruding fixing parts 311 are formed to be spaced apart from each other in the circumferential direction. Thus, when the support member 310 is coupled to the reducer housing 260, the fixing parts 311 are engaged in fixing recesses formed on the inner peripheral surface of the reducer housing 260, thereby preventing the separation of the support member 310 in the axial direction.

In addition, stepped recesses 317 are formed on the other side end of the support member 310 to be stepped in the axial direction the support member 310 and hook portions 321 are formed on one side end of the damping member 320 to extend in the axial direction and to protrude inwardly in the radial direction. Thus, when the hook portions 321 are respectively seated in the stepped recesses 317, it is possible to prevent the damping member 320 from being separated from the support member 310 in the axial direction.

Here, the damping member 320 may be made of an elastic material, such as Natural Rubber (NR), Nitrile Butadiene Rubber (NBR), Chloroprene Rubber (CR), Ethylene Propylene Terpolymer (EPDM), Fluorine Rubber (FPM), Styrene Butadiene Rubber (SBR), Chloro-Sulphonated Polyethylene (CSM), urethane, or silicon.

In addition, the inner peripheral surface of the support member 310 is formed in a long hole shape that is formed to extend in a direction where the worm shaft 254 and the worm wheel 156 are engaged with each other. Guide surfaces 318 are provided on the opposite sides of the inner peripheral surface of the support member 310 to be parallel with each other. Thus, the outer peripheral surface of the worm shaft bearing 257 is adapted to be movable in the direction where the worm shaft 254 and the worm wheel 156 are engaged with each other, while being supported by the guide surfaces 318.

That is, gaps are respectively provided at the upper and lower sides of the worm shaft bearing 257, that is, at the upper and lower sides in the direction where the worm shaft 254 and the worm wheel 156 are engaged with each other. Thus, when the worm wheel 156 is worn out and external impact is applied thereto, the worm shaft bearing 257 may be moved up and down along the guide surfaces 318 of the support member 310.

The support member 310 includes a first through-hole 315 formed through the inner peripheral surface and the outer peripheral surface thereof, and the damping member 320 includes a first protrusion 325 that is provided on the inner peripheral surface thereof and is inserted into the first through-hole 315 to support the worm shaft bearing 257 toward the worm shaft 254.

Here, the end portion of the first protrusion 325 is formed to protrude to the inside of the support member 310, and a gap is provided between the outer race of the worm shaft bearing 257 and the end portion of the first protrusion 325.

In addition, the support member 310 includes a second through-hole 313 formed at a position facing the first through-hole 315, and the damping member 320 includes a second protrusion 323 that is provided on the inner peripheral surface thereof and is inserted into the second through-hole 313 to support the worm shaft bearing 257 toward the worm shaft 156.

In addition, the end portion of the second protrusion 323 protrudes to the inside of the support member 310, and a gap is provided between the outer race of the worm shaft bearing 257 and the end portion of the second protrusion 323 such that an elastic support member 330 to be described below is inserted into the gap.

Accordingly, when the worm wheel 156 is worn out and external impact is applied thereto, the worm shaft bearing 257 are dampened with each of the first protrusion 325 and the second protrusion 323 at the lower and upper sides of the worm shaft bearing 257 while moving up and down along the guide surfaces 318 of the support member 310.

In addition, the elastic support member 330 having a radially outwardly or inwardly convex thin plate shape is coupled between the second protrusion 323 and the worm shaft bearing 257 so as to support the worm shaft 254 toward the worm wheel when a clearance is generated by the wear and tear of the worm wheel 156.

Figure 5:
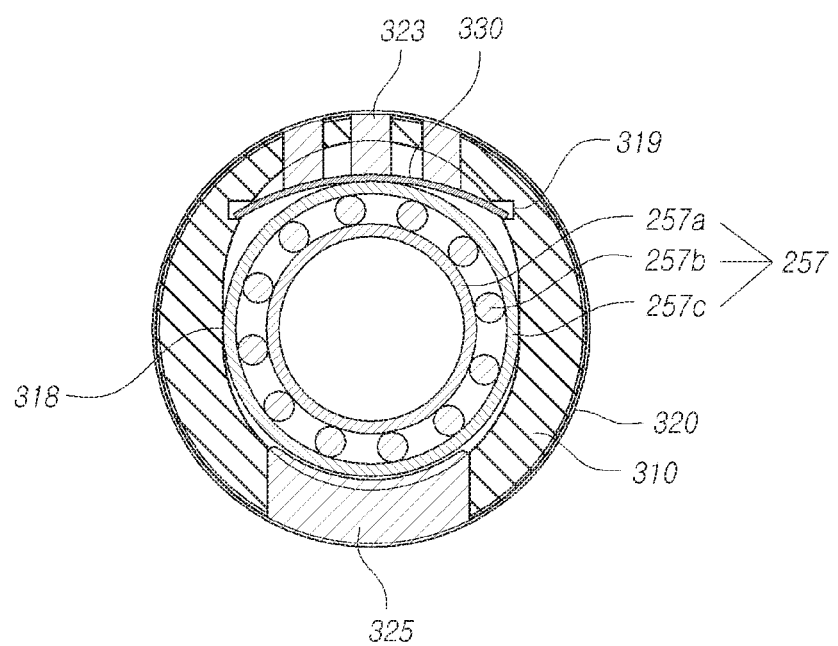
FIGS. 5 to 8 are cross-sectional views each illustrating a reducer of an electric power steering apparatus according to an embodiment of the present invention.
Figure 6:
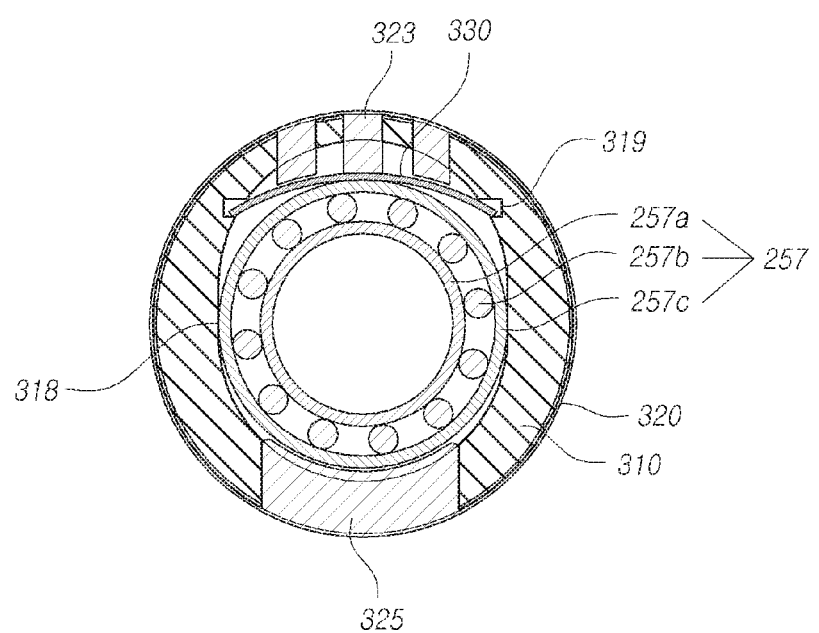
Figure 7:
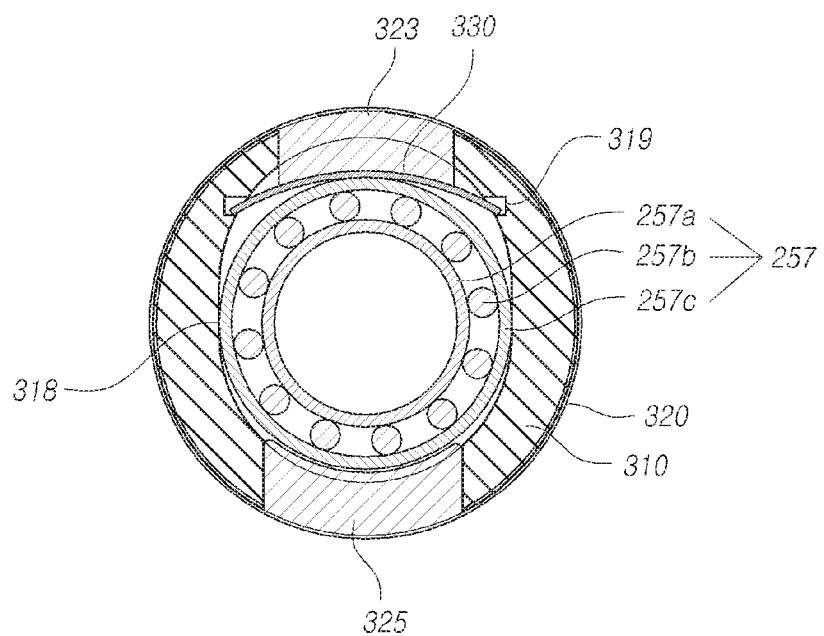
Figure 8:
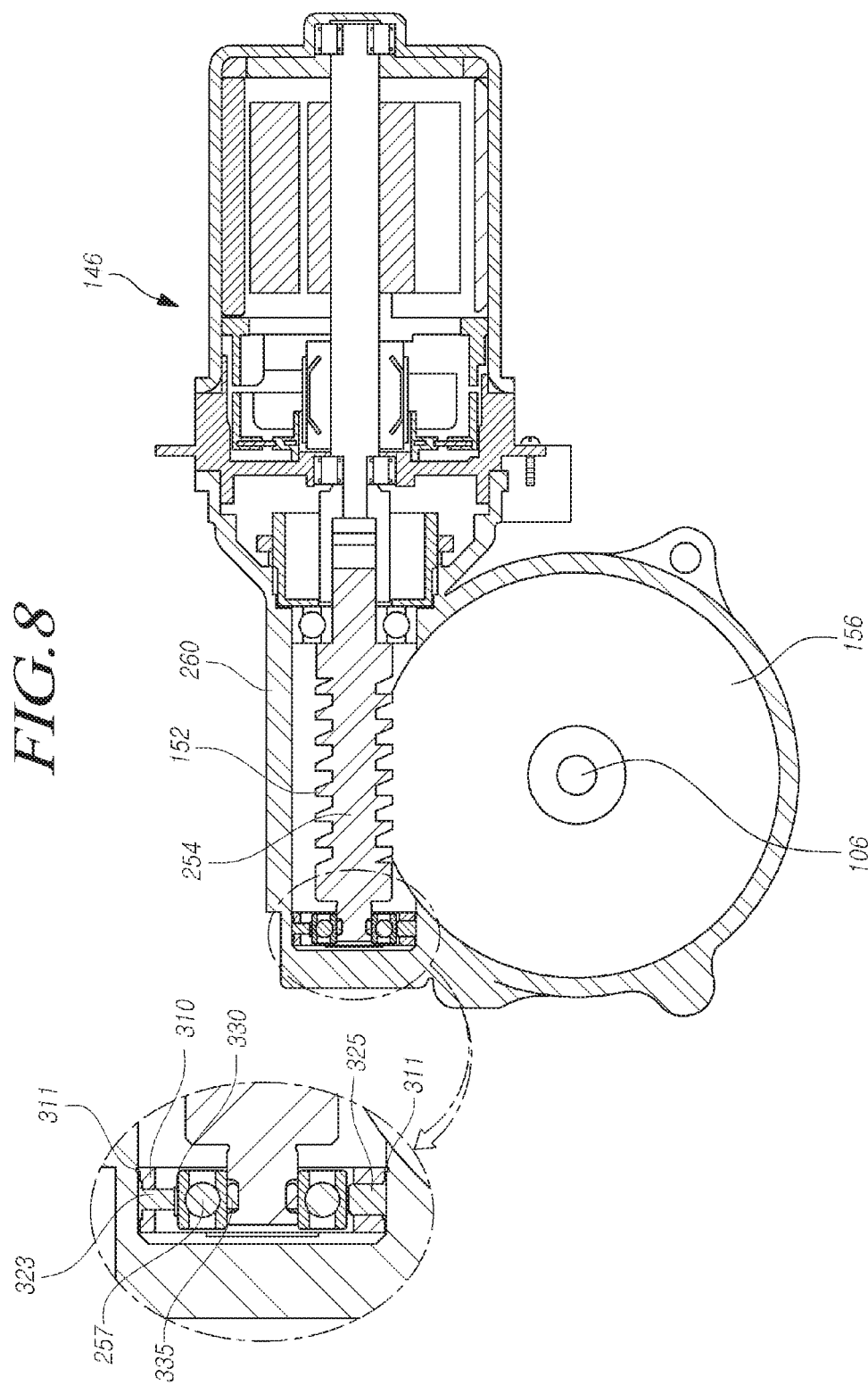

As illustrated in FIGS. 5 and 6, several second protrusions 323 may be provided to be spaced apart from each other in the circumferential direction, or as illustrated in FIG. 7, a single integrally-formed second protrusion 323 may be provided.

First, referring to FIG. 5, several second protrusions 323 are provided to be spaced apart from each other in the circumferential direction. Among the second protrusions 323, the second protrusion 323, which supports the central portion of the elastic support member 330, is formed to have a radially inward protrusion amount which is smaller than that of the second protrusions 323 adjacent thereto. Thus, the supporting force, which is applied to the elastic support member 330 by the second protrusions 323, is distributed in the circumferential direction rather than being concentrated to the central portion, and as a result, the supporting force of the worm shaft bearing 257 is not biased to any one side.

That is, when the protrusion amount of the second protrusions 323 adjacent to the opposite side with reference to the central portion of the elastic support member 330 is formed to be larger than that of the central portion such that a plane interconnecting the ends of the second protrusions 323 forms a curved plane that is convex in the same direction as the outer race of the worm shaft bearing 257, a force, which supports the worm shaft bearing 257 when impact is transferred from a road surface, is not biased to any one side.

In addition, referring to FIG. 6, the second protrusion 323, which supports the central portion of the elastic support member 330, is in close contact with the elastic support member 330 to be supported, and a gap may be provided between the second protrusions 323 adjacent thereto and the elastic support member 330.

That is, when impact is transferred from the outside, the worm shaft 254 moves upward, and the worm shaft bearing 257 also moves upward. When the transferred impact amount is large, the second protrusion 323, which supports the central portion, is elastically deformed, and then the second protrusions 323 adjacent thereto come in close contact with the elastic support member 330 to be elastically deformed. Thus, the impact can be sequentially dampened according to the magnitude of the impact amount.

Referring to FIG. 7, a single integrally-formed second protrusion 323 is configured to be in close contact with the elastic support member 330 to be supported. In this case, the second protrusion 323 is configured to be elastically deformed while supporting the elastic support member 330 over a wide region in the circumferential direction. Thus, even if the magnitude of an impact amount is variously changed, the impact can be supported to be distributed in the circumferential direction without being biased to one side.

In addition, fixing recesses 319 are provided at the opposite sides of the inner peripheral surface of the support member 310 such that the opposite ends of the elastic support member 330 are fixedly coupled thereto.

In addition, on the outer peripheral surface of the worm shaft 254, a fitting recess is formed in the circumferential direction such that an elastic ring 335 can be fitted thereto. Thus, between the worm shaft bearing 257 and the worm shaft 254, the elastic ring 335 can prevent impact and noise from being generated when the worm shaft 254 plays.

Now, the operation of the clearance compensation device 300 described above will be described in more detail. First, when the clearance compensation device 300 is assembled to the reducer housing 260, the assembly is completed in the state where a gap is provided between the first protrusion 325 and the worm shaft bearing 257 in the state where the worm shaft 254 and the worm wheel 156 are engaged with each other. In the opposite direction, the elastic support member 330 is coupled to the fixing recess 319 of the support member 310 while being bent to compress the second protrusion 323.

Accordingly, in the state where the assembly is completed, the worm shaft 254 is elastically supported toward the worm wheel 156 by the elastic restoring force of the second protrusion 323 and the elastic support member 330 such that no clearance exists between the worm shaft 254 and the worm gear portion of the worm wheel 156.

However, when the reducer is operated after the assembly, a force is applied to cause the worm shaft 254 to be biased to any one side in the radial direction due to the forward and reverse rotations of the worm shaft 254, and an impact load input from a road surface and transferred to the worm shaft 254. When a force is applied to the worm shaft 254 up and down, the elastic support member 330, the first protrusion 325, and the second protrusion 323 are compressed and tensioned, which causes the worm shaft bearing 257 to be slid up and down along the guide surfaces 318 of the support member 310.

In this case, when the load is transferred in a direction opposite to the direction where the worm shaft 254 and the worm wheel 156 are engaged with each other, the elastic restoring force of the first protrusion 325 acts. Thus, a compensating force directly acts to cause the worm shaft 254 to immediately return to the original position thereof.

Accordingly, the clearance generated between the worm 152 and the worm wheel 156 is normally compensated for by the elastic restoring force of the second protrusion 323 and the elastic support member 330. However, when an impact transferred from a road surface through the vehicle wheels and the steering shaft at a predetermined angle, the worm shaft bearing 257 is slid upward along the guide surfaces 318 by the elastic restoring force of the first protrusion 325, which enables the worm shaft 254 to immediately return to the original position thereof.

According to the embodiments of the present invention which have the shapes and structures described above, a reducer of an electric power steering apparatus is capable of correctly assisting a driver's steering wheel operating force by preventing a clearance from occurring by the wear and tear of a worm and a worm wheel, reducing impact transferred from a road surface and rattle noise generated by a backlash, and minimizing a variation of the clearance according to the change of a rotational torque.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A reducer of an electric power steering apparatus, the reducer comprising:
    a worm shaft having a worm formed thereon;
    a worm wheel having a worm gear formed thereon to be engaged with the worm; and
    a clearance compensation device coupled to a worm shaft bearing provided on an end of the worm shaft and, in order to elastically support the end of the worm shaft within a reducer housing, including a ring-shaped support member coupled to an inner side of the reducer housing, and a damping member coupled to an outer peripheral side of the support member to be elastically supported by the reducer housing, the support member having a seating recess formed on an outer peripheral surface in a circumferential direction such that an inner peripheral surface of the damping member is seated in the seating recess to be supported,
    wherein the support member includes a first through-hole formed through the outer peripheral surface and the inner peripheral surface thereof, and the damping member includes a first protrusion disposed on the inner peripheral surface thereof to be inserted into the first through-hole to support the worm shaft bearing toward the worm shaft,
    wherein the support member includes a second through-hole arranged at a position facing the first through-hole, and the damping member includes a second protrusion disposed on the inner peripheral surface thereof to be inserted into the second through-hole to support the worm shaft bearing toward the worm shaft, and wherein, between the second protrusion and the worm shaft bearing, a radially outwardly or inwardly convex elastic support member is coupled, and the second protrusion is in contact with the elastic support member to be supported.

2. The reducer of claim 1, wherein the inner peripheral surface of the support member is formed in a long hole shape that is formed in a direction where the worm shaft and the worm wheel are engaged with each other.

3. The reducer of claim 2, wherein the support member includes guide surfaces that are formed on opposite sides of the inner peripheral surface thereof to be parallel with each other such that an outer peripheral surface of the worm shaft bearing is supported and is movable in the direction where the worm shaft and the worm wheel are engaged with each other.

4. The reducer of claim 1, wherein an end portion of the first protrusion protrudes to an inside of the support member, and a gap is provided between the end portion of the first protrusion and an outer race of the worm shaft bearing.

5. The reducer of claim 1, wherein an end portion of the second protrusion protrudes to an inside of the support member, and a gap is provided between the end portion of the second protrusion and an outer race of the worm shaft bearing.

6. The reducer of claim 5, wherein several second protrusions are provided to be spaced apart from each other in a circumferential direction.

7. The reducer of claim 6, wherein, between the second protrusions and the worm shaft bearing, a radially outwardly or inwardly convex elastic support member is coupled.

8. The reducer of claim 7, wherein the second protrusions are formed such that the second protrusion, which supports a central portion of the elastic support member, has a radially inwardly protruding amount that is smaller than that of the second protrusions adjacent thereto.

9. The reducer of claim 8, wherein the second protrusion, which supports the central portion of the elastic support member, is in close contact with the elastic support member to be supported, and a gap is provided between the second protrusions adjacent thereto and the elastic support member.

10. The reducer of claim 8, wherein at opposite sides of the inner peripheral surface of the support member, fixing recesses are formed and opposite ends of the elastic support member are fixedly coupled to the fixing recesses, respectively.

11. The reducer of claim 1, wherein an elastic ring is coupled between an outer peripheral surface of an end of the worm shaft and an inner race of the worm shaft bearing.

12. The reducer of claim 11, wherein a coupling recess is formed on the end portion of the worm shaft in a circumferential direction, and the elastic ring is seated in the coupling recess.

* * * * *